(12) United States Patent
Nazarko et al.

(10) Patent No.: US 8,778,054 B2
(45) Date of Patent: Jul. 15, 2014

(54) POWER STATION AND METHOD FOR OPERATING THE SAME

(75) Inventors: Jewgeni Nazarko, Dueren (DE); Ernst Riensche, Juelich (DE); Reinhard Menzer, Simmerath (DE); Wilhelm Albert Meulenberg, AA Vijlen (NL); Stefan Baumann, Aachen (DE)

(73) Assignee: Forschungszentrum Juelich GmbH, Juelich (DE)

( * ) Notice: Subject to any disclaimer, the term of this patent is extended or adjusted under 35 U.S.C. 154(b) by 113 days.

(21) Appl. No.: 13/138,977

(22) PCT Filed: Apr. 3, 2010

(86) PCT No.: PCT/DE2010/000385
§ 371 (c)(1),
(2), (4) Date: Dec. 2, 2011

(87) PCT Pub. No.: WO2010/133193
PCT Pub. Date: Nov. 25, 2010

(65) Prior Publication Data
US 2012/0060728 A1 Mar. 15, 2012

(30) Foreign Application Priority Data
May 16, 2009 (DE) .......................... 10 2009 021 623

(51) Int. Cl.
*B01D 53/22* (2006.01)
(52) U.S. Cl.
USPC .................... 96/4; 96/7; 96/11; 95/43; 95/45; 95/54
(58) Field of Classification Search
CPC ....... B01D 53/22; B01D 53/228; B01D 63/08
USPC ............................. 95/43, 45, 54; 96/4, 7, 11
See application file for complete search history.

(56) References Cited

U.S. PATENT DOCUMENTS

| 5,643,354 | A | * | 7/1997 | Agrawal et al. | 75/490 |
| 5,826,521 | A | * | 10/1998 | Schumann et al. | 110/345 |
| 6,702,570 | B2 | * | 3/2004 | Shah et al. | 431/11 |
| 2004/0002030 | A1 | * | 1/2004 | Shah et al. | 431/12 |
| 2010/0126137 | A1 | * | 5/2010 | Hamrin | 60/39.461 |
| 2010/0263377 | A1 | * | 10/2010 | Meulenberg et al. | 60/645 |

FOREIGN PATENT DOCUMENTS

| DE | 43 13 102 | 10/1994 |
| DE | 103 28 863 | 1/2004 |

(Continued)

OTHER PUBLICATIONS

Reinhold Kneer, Malte Foerster, Dirk Abel, Horst r: Maier, Michael Modigell, Reinhard Niehuis, Norbert Peters (2006) OXYCOAL-AC—Innovative Herausforderungen fuer eine saubee loesung der zukuenftigen Stromerzeugung [Innovative Challenges for a Clean Solution to future Power Generation], VGB Power Tech, 10, 74-81.

*Primary Examiner* — Jason M Greene
*Assistant Examiner* — Anthony Shumate
(74) *Attorney, Agent, or Firm* — Jordan and Hamburg LLP

(57) ABSTRACT

A method for generating heat energy in a power plant by burning a carbonaceous fuel in a combustion chamber of the power plant and a system for carrying out the method is described. A combustion chamber is fluidly connected to a membrane chamber that includes a membrane operating at a temperature between 600 and 1000° C. The combustion chamber receives a cleaned flue-gas oxygen mixture for combustion from the membrane chamber. Oxygen from heated air passes through the membrane in the membrane chamber to the permeate side of the membrane, where it is mixed with cleaned heated flue gas and the resulting gas mixture is fed to the combustion chamber. Flue gas removed from the combustion chamber are cooled, cleaned and heated as described herein and recirculated to the membrane chamber.

15 Claims, 3 Drawing Sheets

(56) References Cited

FOREIGN PATENT DOCUMENTS

| DE | 10 2005 025 345 | 12/2006 |
| DE | 10 2007 056 841 | 5/2009 |
| WO | WO-2008/087150 | 7/2008 |
| WO | WO-2009/019218 | 2/2009 |
| WO | WO-2009/065374 | 5/2009 |
| WO | WO-2009/106026 | 9/2009 |

* cited by examiner ced on the oxyfuel concept in which
POWER STATION AND METHOD FOR OPERATING THE SAME The invention relates to a power plant for energy conversion, and in particular to a power plant in which the energy conversion takes place in a flue gas/oxygen atmosphere (oxyfuel process). The invention further relates to a method for operating such a power plant.

BACKGROUND OF THE INVENTION

One of the most significant sources of the increase in carbon dioxide concentration in the atmosphere is the burning of fossil fuels in furnaces with the objective of energy conversion. Attempts are therefore made to extract $CO_2$ from the combustion of fossil fuels and subsequently store it, so as to prevent it from entering the atmosphere. The reasons for these efforts are the greenhouse effect and the consequent global warming.

Currently there are three basic concepts for the extraction of carbon dioxide, which differ according to the placement of $CO_2$ extraction in the energy conversion process. They are $CO_2$ extraction after energy conversion (post-combustion), $CO_2$ extraction before energy conversion (pre-combustion) and the generation of a $CO_2$-rich flue gas by way of energy conversion in a flue gas-oxygen atmosphere (the so-called oxyfuel process).

In the oxyfuel process, $CO_2$ is concentrated by condensing the water vapor after combustion of the carbon-containing fuel with pure oxygen. Pure oxygen can be extracted from the air either by way of conventional cryogenic air separation or using a membrane. To limit the combustion temperature, a portion of the flue gas must be reintroduced regularly into the combustion process.

Oxygen-conducting high-temperature membranes have great developmental potential for extracting oxygen from air, in particular due to energy-related considerations. Such an ion-conducting membrane regularly requires an operating temperature ranging between 600 and 1000° C. The driving force for oxygen transport results from the difference in the oxygen partial pressure on the feed side and the permeate side of the membrane unit, and is generally quantified using the Wagner equation. If a sufficient driving force for oxygen transport is present, membrane effects result in concentration of the oxygen on the permeate side.

Membrane-based oxyfuel designs are being developed in numerous research and industrial projects. One of them is the oxycoal-AC design illustrated in FIG. 1, which was developed in a joint project at the RWTH Aachen, so as to develop a $CO_2$ emission-free carbon combustion process for power generation.

A main feature of this design is the combination of two methods for generating driving force in the oxygen-conducting high-temperature membrane unit. Fresh air is compressed on the feed side and subsequently expanded for partial energy recovery, and the permeate side of the membrane is flushed using the recycled flue gas (combustion gas) having a temperature at level of the operating temperature of the membrane unit, thereby removing the permeating oxygen on the permeate side. The oxygen-enriched flue gas which is subsequently fed to the burner is composed mainly of $CO_2$, $H_2O$ and $O_2$, and typically has an oxygen content of approximately 17% by volume. Both methods for generating driving force result in a partial pressure differential for oxygen forming between the feed side and the permeate side.

The concept described, however, has a few disadvantages:
Driving the turbo components for air compression results in high energy consumption.
Scrubbing the flue gas to be recycled at temperatures corresponding to the membrane operating temperature (hot gas scrubbing) is currently unavailable on the required scale.
Flue gas blowers for conveying the flue gas to be recycled at temperatures corresponding to the membrane operating temperature (hot gas scrubbing) are currently unavailable on the required scale.
A conventional fresh air-flue gas heat exchanger which operates at a pressure ratio of up to 20 bar to 1 bar can be attained only at high cost.
The high pressure differential between the feed side and the permeate side of the membrane necessitates a high stability membrane.

A further membrane-based oxyfuel design was developed by Siemens AG, which is referred to in the following as the clean concept and is depicted in FIG. 2. According to the clean concept, the permeate side of the membrane is no longer flushed using the flue gas, in contrast to the oxycoal-AC concept. The oxygen permeating through the membrane is conveyed out of the membrane unit optionally using a pump, and is subsequently added to the flue gas which is returned to the combustion process. Maintenance of the required process temperature of the membrane unit is ensured solely by heating the air after air compression using heat exchange. To ensure the necessary operating temperature of the membrane, the heat exchanger extracts the heat required therefor from the flue gas produced during operation of the burner.

Advantages of this concept from Siemens are the avoidance of hot gas scrubbing, prevention of possible damage to the membrane by the components of the flue gas, shortening of the flue gas recirculation line, and the possibility of integrating the membrane module in first-generation oxyfuel methods which are characterized by oxygen being provided using an air separation system and by cold flue gas recirculation.

This concept also has a few disadvantages, however:
Driving the turbo components for air compression results in high energy consumption.
The process control results in reduction of the driving force through the membrane (with constant energy consumption as in the oxycoal-AC concept).
The high pressure differential between the feed side and the permeate side of the membrane results in high stability requirements on the membrane.

SUMMARY OF THE INVENTION

The object of the invention is to provide a method for the operation of an oxyfuel combustion system comprising an oxygen-conducting membrane, which overcomes the aforementioned disadvantages of the prior art. The further object of the invention is to provide a suitable device for carrying out the aforementioned method.

The objects of the invention are achieved by a method according to the main claim, and by a device having the totality of the features according to the alternative independent claim. Advantageous embodiments of the method and the device are found in the specific back-referencing dependent claims.

The invention is based on the oxyfuel concept in which energy conversion takes place in a flue gas/oxygen atmosphere (oxyfuel process). The oxygen required therefor is made available using an oxygen-conducting high-temperature membrane. In order to influence the resulting combustion chamber temperature, a certain quantity of the cooled exhaust gas or flue gas is recirculated, i.e. is blown into the combustion chamber together with the fuel and the oxygen. The combustion chamber temperature is dependent upon the temperature of the recirculated flue gas mass flow, the ratio thereof to the fuel mass flow and the air ratio, and, depending on the type of power plant, is typically between 1050 to 1200° C.

According to the invention, an oxygen-containing gas, and in particular air, is not highly compressed in advance and subsequently fed to the oxygen-conducting membrane, as in the prior art, but rather is fed to the membrane only under moderate pressures (up to 2 bar max.). The permeate side of the oxygen-conducting membrane unit is flushed with flue gas which is subsequently returned to the combustion system.

In the following, "combustion system" is understood to be any system in which a gaseous, liquid and/or solid, carbon-containing fuel is oxidized to utilize the generated heat. This includes, for example, gas burners which are operated with natural gas, liquid gas, city gas or landfill gas, oil burners which are operated using petroleum, heating oil or alcohols, for example, and grate firing for piece-wise fuels such as gas-rich hard coal, wood chips or waste, fluidized-bed combustion or coal dust firing.

Flue gas or combustion gas is the combustion product containing solid, liquid and/or gaseous pollutants produced by the technical combustion of fuels. Gaseous pollutants include, for example, nitrogen, carbon dioxide, carbon monoxide, sulfur dioxide, nitrogen oxide and water vapor. As solids, particularly fly ash and soot occur.

In the method according to the invention, the oxygen-containing gas is preheated to ensure the required operating temperature of the oxygen-conducting membrane of typically 600 to 1000° C. This can take place in a recuperative manner, for example, by way of preheating using the oxygen-depleted exhaust air (retentate of the membrane). However, the oxyen-containing gas can also be heated using the flue gas inside and/or outside of the combustion chamber. By "outside of" it is understood that the heat exchange takes place outside of the combustion chamber, although the flue gas still has approximately the temperature level of the combustion chamber.

In a particularly advantageous embodiment, both possibilities for preheating the oxygen-containing gas are used, first in a recuperative manner using the relatively oxygen-poor exhaust air from the oxygen-carrying membrane, and subsequently by the flue gas itself. The oxygen-containing gas is heated to the operating temperature of the membrane of approximately 600 to 1000° C.

To maintain the operating temperature of the oxygen-conducting membrane, alternatively or as an additional option, the oxygen-containing gas can be heated externally, using external firing, for example.

The oxygen-depleted exhaust air on the retentate side of the oxygen-conducting membrane can be cooled in a recuperator, preferably to the ambient temperature, to recover the heat. The heat utilization of the exhaust air is therefore considerably improved.

To increase the driving force at the membrane, instead of air, air enriched with oxygen can also be used as a preferred oxygen-containing gas, as an alternative. In this case, the oxygen is concentrated with a lower $O_2$ purity by the use of a (polymer) membrane and/or an energetically optimized air separation system, for example.

Depending on the optimal rating point of the system for oxygen enrichment, it can be advantageous for the energetic optimization of the total process to dilute the generated, oxygen-enriched air with ambient air.

In the oxyfuel design, due to the combustion with virtually pure oxygen, markedly higher combustion temperatures (up to over 4000° C.) can occur than in combustion with air. The heat of the flue gas from the combustion process is extracted therefrom preferably to the extent that is technically and economically feasible with consideration for the flue gas composition. The recirculated flue gas therefore replaces atmospheric nitrogen, which is otherwise common.

The cooled flue gas is subsequently fed to the flue gas scrubbing process. The flue gas scrubbing process can comprise a plurality of components which can differ under certain circumstances depending on the flue gas composition and the requirements on the downstream membrane. The individual steps of a typical flue gas scrubbing process are known from the prior art.

After the flue gas scrubbing process, the portion of flue gas that has been recirculated and conveyed using the flue gas blower is subsequently easily reheated to the operating temperature of the membrane by way of heat exchange with the flue gas that has the corresponding temperature level of the combustion process inside and outside of the combustion chamber. Next, the recirculated portion of the flue gas reaches the oxygen-conducting membrane and serves as flushing gas for maintaining the driving force and for removing the oxygen that has permeated through the membrane.

To maintain the operating temperature of the membrane, external heating (external firing, for example) of the recirculated portion of the flue gas can be provided, alternatively or additionally.

Fresh air is preheated in a heat exchanger by a portion of the permeate from the membrane, comprising the recirculated flue gas and the permeated oxygen. The redirected mixture of the oxygen that has been removed and the recirculated flue gas advantageously cools to the temperature that is optimal for conveying the fuel into the combustion chamber.

For the case in which the flue gas serves as the flushing gas and is to suffice alone in generating the driving force, that is, without turbo machinery, a large quantity of flue gas must flow past the membrane. If the flue gas is cooled in advance, however, the temperature of the operating chamber decreases greatly. For this reason it would be advantageous if the recirculated flue gas were to remain hot downstream of the membrane. This can be achieved, for instance, by cooling only a portion of the flue gas, which is then used to convey the fuel into the combustion process. As a result, however, a lower oxygen content could develop on the permeate side, e.g. 10-15% by volume, than in the air on the feed side (21% by volume). Combustion using a lower oxygen content is relatively unknown, however. Cooling the entire permeate therefore typically makes sense only when the generation of driving force is optionally also supported on the feed side by other means such as turbo machinery or oxygen-enriched air.

In a further embodiment, the fresh air can be separated into a plurality of partial flows, wherein each partial flow can also be heated separately using the aforementioned possibilities. After the fresh air partial flows are combined, it must be possible to ensure that the operating temperature of the membrane is maintained.

As an additional option the recirculated portion of the flue gas can be preheated by the permeate from the membrane, comprising the oxygen that was removed and the recirculated flue gas, in the flue gas having the corresponding temperature level of the combustion process inside or outside of the combustion chamber in a recuperator before heating by the heat exchanger. As a result, the mixture of the oxygen that was removed and the recirculated flue gas cools to the temperature that is optimal for introduction into the combustion chamber.

The advantages of the method according to the invention over the oxycoal-AC concept and the clean concept from Siemens are the following:

- Improved heat utility of the oxygen-poor exhaust air in the preheating of fresh air or oxygen-enriched air,
- Reduced energy consumption in the total process, due to the flue gas flushing and the elimination of turbo components,
- Elimination of the need to clean the hot flue gas to be recirculated, and the scrubbing of the cold flue gas being the state of the art,
- Elimination of the need to convey the hot flue gas to be recirculated using the flue gas blower, and the conveyance of the cold flue gas being the state of the art,
- Elimination of the need for heat exchange between two gas flows with a high pressure ratio (20 to 1, for example) since flue gas and fresh air are present virtually pressure-free,
- The virtually pressure-free flue gas and fresh air flows place lower stability requirements on the membrane.

The invention is explained in greater detail hereafter with reference to embodiments, without the scope of the invention being limited as a result. A competent person skilled in the art of power plants will be able to easily consider alternative embodiments as belonging to the invention.

DESCRIPTION OF THE PREFERRED EMBODIMENTS

Figure 1:
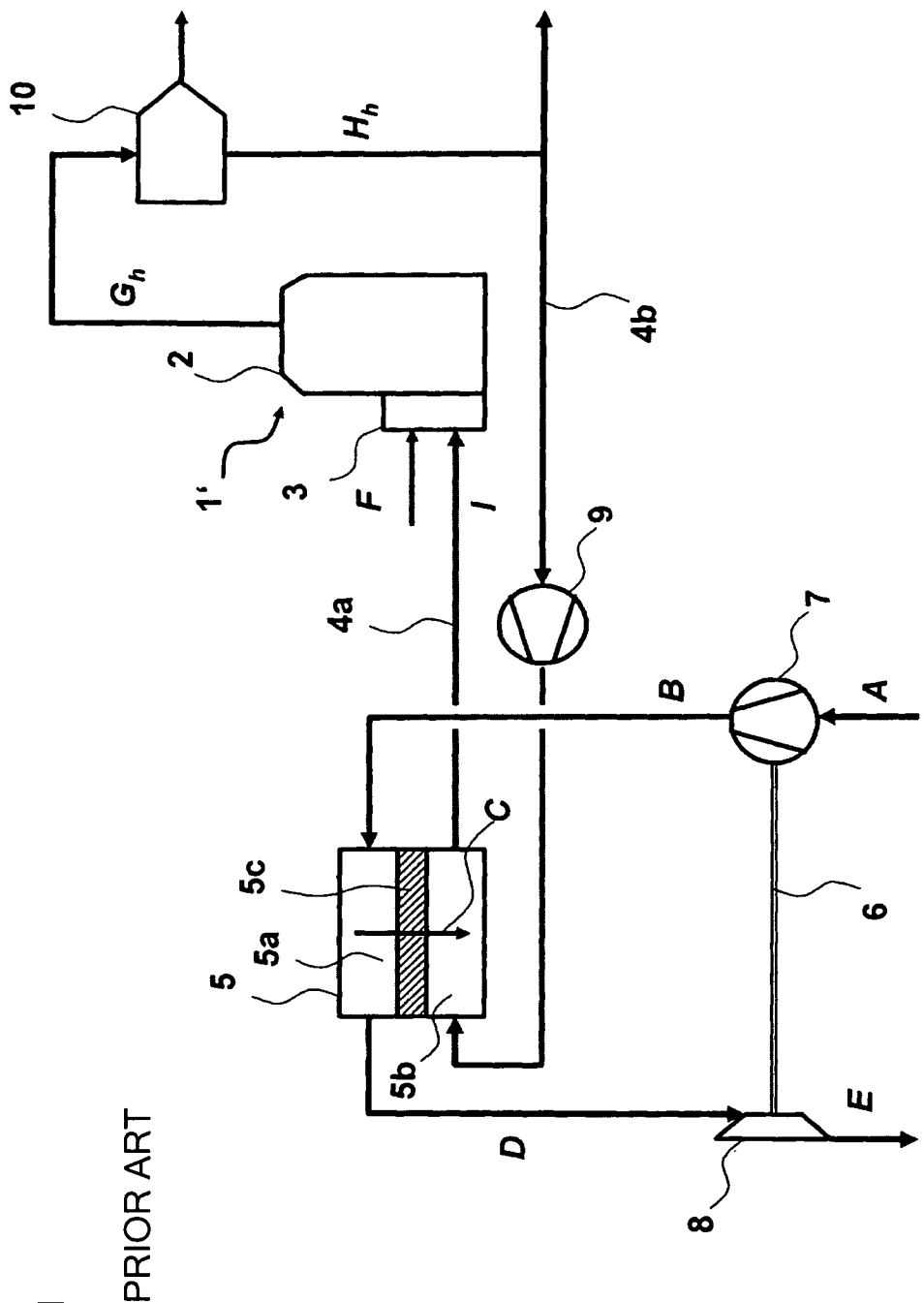
FIG. 1 shows the process of the oxycoal-AC concept, which was developed in a joint project at the RWTH Aachen to develop a $CO_2$ emission-free carbon combustion process for power generation.

FIG. 1 shows the process of the oxycoal-AC concept, which was developed in a joint project at the RWTH Aachen to develop a $CO_2$ emission-free carbon combustion process for power generation. (See also: Reinhold Kneer, Malte Förster, Dirk Abel, Horst r: Maier, Michael Modigell, Reinhard Niehuis, Norbert Peters (2006) OXYCOAL-AC—Innovative Herausforderungen für eine saubere Lösung der zukünftigen Stromerzeugung [Innovative Challenges for a Clean Solution to Future Power Generation], *VGB PowerTech,* 10, 74-81). The combustion system 1', which is known from the prior art, has a combustion chamber 2 comprising an upstream burner 3. In a steam generation system, the combustion chamber and the steam generator often form one unit. Therein, a fuel F is burned together with flue gas I enriched with oxygen, wherein the water in the pipe system of the steam generator (not depicted) is converted to steam having a high temperature. After scrubbing in a hot gas scrubbing stage 10, the hot raw flue gas $G_h$ arrives, by way of the circulation line 4b as scrubbed hot flue gas $H_h$, at the membrane unit 5 as flushing gas by way of a hot gas blower 9.

In the oxycoal process, the oxygen C for combustion is extracted, by way of a membrane 5c of a membrane unit 5, the retentate side 5a of which is supplied with compressed air B, from said air, and is fed to the circulating flue gas flow I which is fed by way of the circulation line 4a to the burner 3 or the combustion chamber 2. The temperature of the air heated by way of compression (20 bar, approximately 400° C.) is usually insufficient for maintaining the operating temperature of the membrane, however. Therefore, air must be heated further.

The heat quantity required to maintain the required process temperature for the high-temperature membrane is therefore made available mainly by way of the circulating hot flue gas $H_h$ which is fed to the permeate side 5b and is removed together with the separated oxygen I. This operating method consistently ensures a strong driving force in the membrane unit and, therefore, high permeability for oxygen C.

The oxygen-enriched flue gas I fed to the burner typically has an oxygen content of approximately 17% by volume.

The depleted air D from the membrane unit 5 is subsequently fed to an expander 8 which is coupled to the compressor 7 by way of a shaft 6, and is released to the environment as exhaust air E. Air A is drawn in by way of the compressor 7, and is fed as compressed air B to the retentate side 5a of the membrane unit 5.

To reduce the contamination of the high-temperature membrane 5c by contaminants in the hot raw flue gas $G_h$, a hot gas scrubbing process 10 is connected between the burner (combustion chamber) and the membrane unit 5c, wherein the circulation is supported by a hot gas blower 11.

Figure 2:
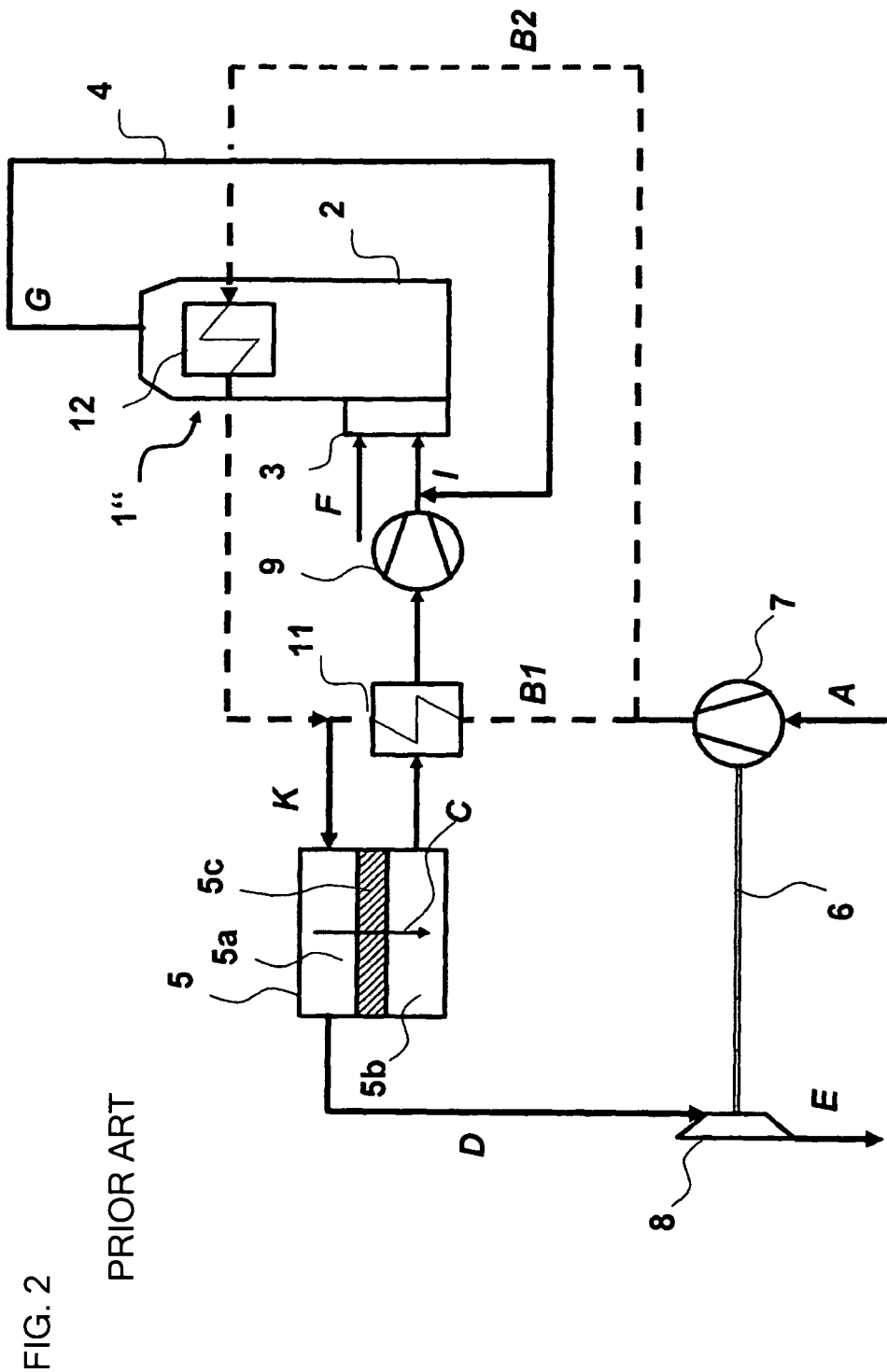
FIG. 2 shows the process of the clean concept from Siemens AG (see also: WO 2009/019218 A2 (Siemens AG).

FIG. 2 shows the process of the clean concept from Siemens AG (see also: WO 2009/019218 A2 (Siemens AG). The known combustion system 1" has a combustion chamber (steam generation system) 2 with an upstream burner 3. Therein, a fuel F is burned together with cooled oxygen I, wherein the water in the pipe system of the steam generator (not depicted) is converted to steam having a high temperature. The hot raw flue gas G is cooled, inter alia, by way of a heat exchanger 12, and is returned to the burner 3 or the combustion chamber 2 with or without cold scrubbing. The long circulation paths of the hot flue gas to and from the membrane unit are therefore eliminated, as contrasted with the oxycoal process.

In the clean concept, the oxygen C for combustion is obtained from the membrane unit 5, the retentate side 5a of which is supplied with compressed air B1 and B2 which is heated by way of a heat exchanger 11 or 12. The oxygen from this air arrives by way of the membrane 5c and is thereby extracted therefrom. The heat quantity required to maintain the required process temperature for the high-temperature membrane is made available exclusively by way of the supplied air K. The compressed air B1 is heated by the flue gas by way of the heat exchanger 12, it being possible to heat the air to temperatures up to 1000° C. Furthermore, the hot oxygen C removed from the membrane unit 5 by way of a blower or vacuum pump 9 and fed to the burner 3 or combustion chamber 2 is routed through a heat exchanger 11 flushed with compressed air B2. The oxygen flow C is lowered to a similar temperature which is the same as that of the circulated flue gas, and the compressed air B1 is preheated to virtually the operating temperature of the high-temperature membrane. The air flows K heated by the heat exchangers 11 and 12 are fed together to the membrane unit 5.

In the membrane unit 5c, which is operated without flushing, there is advantageously no need to protect the membrane from pollutants from the flue gas. The driving force in the membrane unit is ensured by way of the pressure on the feed side and the removal of the permeated oxygen.

As in the oxycoal process, the depleted air D from the membrane unit 5 is subsequently fed to an expander 8 which is coupled to the compressor 7 by way of a shaft 6, and is released to the environment as exhaust air E. Air A is drawn in by way of the compressor 7, and is fed as compressed air B to the retentate side 5a of the membrane unit 5.

Figure 3:
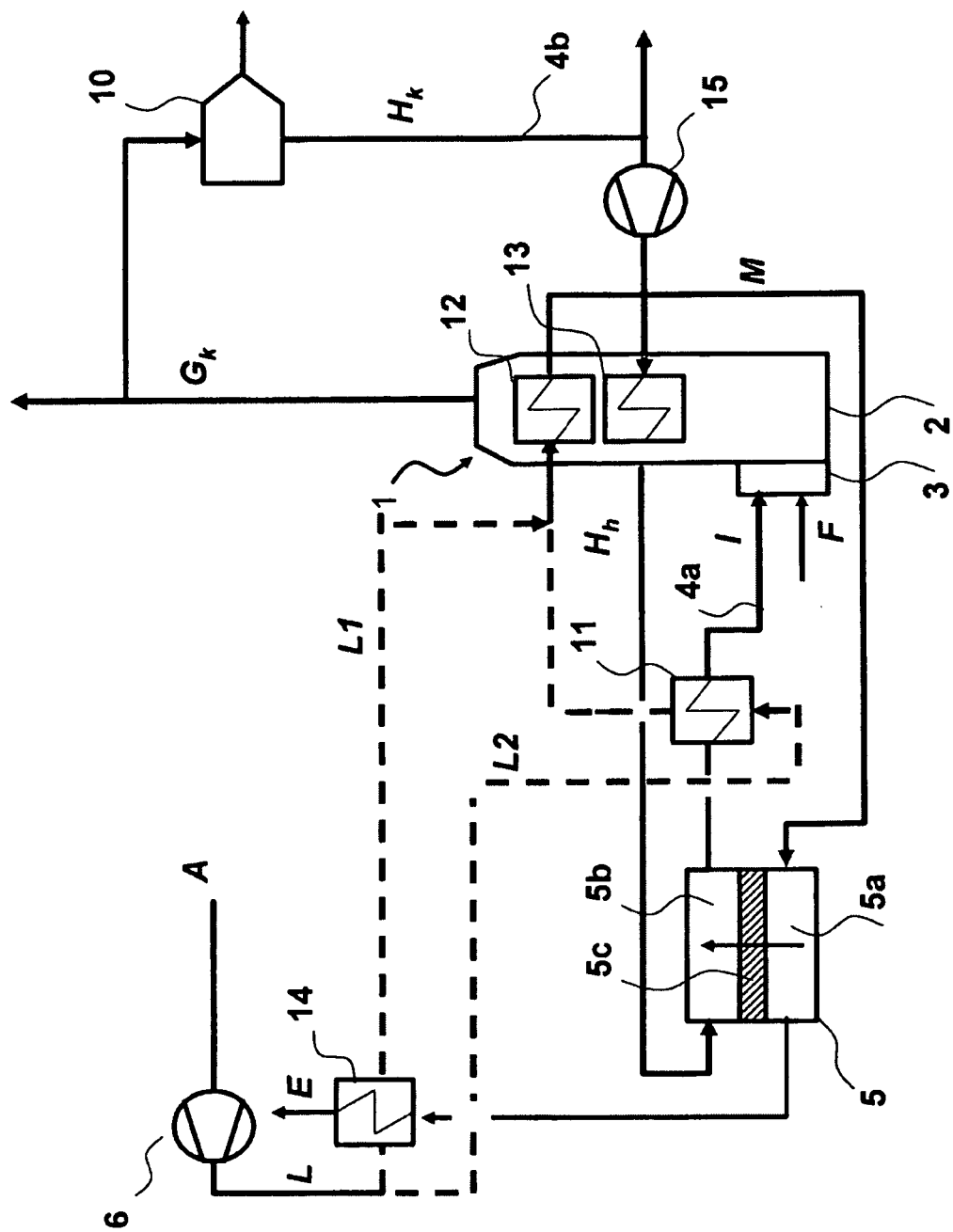
FIG. 3 shows an embodiment of the combustion system 1 according to the invention, in which the carbon-containing fuel F is burned in a flue gas-oxygen atmosphere 1 in a combustion chamber 2 using a burner 3.

In contrast, FIG. 3 shows an embodiment of the combustion system 1 according to the invention, in which the carbon-containing fuel F is burned in a flue gas-oxygen atmosphere 1 in a combustion chamber 2 using a burner 3. After the heat of the flue gas is utilized, inter alia, by the heat exchangers 12 and 13, the cooled raw flue gas $G_k$ is fed initially to a cold gas scrubbing step 10 by way of a circulation line 4b. The scrubbed, cooled flue gas $H_k$ is returned, with the aid of a blower 15, to the steam generation to be reheated there in the heat exchanger 13 by way of the raw flue gas to the operating temperature ($H_h$) of the membrane unit 5 into which it is subsequently routed as flushing gas.

The oxygen C for combustion is again obtained from a membrane unit 5, the retentate side 5a of which is supplied with preheated air or oxygen-enriched air M. The oxygen C diffuses through the high-temperature membrane 5c to the permeate side 5b.

In the present invention, the heat quantity required to maintain the required process temperature for the high-temperature membrane 5c is made available by way of the supplied air M on the retentate side 5a, and is ensured by way of the preheated, circulating flue gas $H_h$ which is fed as flushing gas to the permeate side 5b. The air A required therefor can be divided into two partial flows L1 and L2 which are first preheated by way of the heat exchangers 11 and 14. If the permeate should be introduced into the burner "hot", then the heat exchanger 11 is not necessary. The heat exchanger 14 is suitable for preheating the air flow to 750° C. Before introduction into the membrane unit 5, the combined flows M=L1+L2 are preheated further to the operating temperature of the membrane unit 5 by way of the heat exchanger 12 through which raw flue gas G flows. The depleted air E from the membrane unit 5 enters the surroundings, wherein the heat content thereof is first transferred, at least in part, to the fresh partial air flow L1 by way of the heat exchanger 14. The partial air flow L2 is preheated by the heat exchanger 11 through which oxygen-enriched flue gas flow I flows.

As a further option, compressed air can also be fed to the high-temperature membrane 5c.

The differences in the operating method are summarized once more in the following.

| Feature | Oxycoal-AC concept | Clean concept from Siemens | Invention |
|---|---|---|---|
| Impinge upon the rententate side of the HT membrane | with compressed air heated by way of flue gas | with compressed, heated air | with heated air |
| Flush the permeate side of the HT membrane | with scrubbed, recirculated, hot flue gas | none | with scrubbed, recirculated, heated flue gas |
| Maintain the operating temperature of the membrane | using scrubbed, recirculated, hot flue gas | using heated air | using scrubbed, recirculated, heated flue gas and heated air |

The invention claimed is:

1. A method for generating heat energy in a power plant by burning a carbonaceous fuel in a combustion chamber of the power plant in which the combustion chamber is provided with an atmosphere including a gas mixture of oxygen and cleansed heated flue gas, the method comprising the steps of:

(a) creating a gas mixture of cleansed heated flue gas and oxygen in a membrane chamber;
(b) supplying the gas mixture from the membrane chamber to the combustion chamber;
(c) supplying a carbonaceous fuel to the combustion chamber;
(d) burning the carbonaceous fuel in the combustion chamber in the presence of the gas mixture;
(e) creating the gas mixture by (1) adding heated fresh air at a pressure not exceeding 2 bars to a membrane chamber on a retentate side of a membrane present in the membrane chamber, the heated fresh air being at a temperature corresponding to an operating temperature of the membrane, the operating temperature of the membrane being in the range of 600° C. to 1000° C., whereby oxygen in the heated fresh air passes to a permeate side of the membrane and a resulting oxygen-depleted exhaust air is removed from the retentate side of the membrane chamber, and (2) introducing the cleansed heated flue gas to the permeate side of the membrane, whereby the oxygen on the permeate side of the membrane mixes with the cleansed heated flue gas and the gas mixture is created;
(f) preparing the cleansed heated flue gas by (1) cooling flue gas produced by the burning of the carbonaceous fuel in the combustion chamber to provide cooled flue gas and cleansing the cooled flue gas to provide cleansed cooled flue gas and (2) heating the cleansed cooled flue gas to provide the heated cleansed flue gas, the heated cleansed flue gas being heated to a temperature corresponding to the operating, temperature of the membrane, the cleansed heated flue gas being introduced to the permeate side of the membrane as indicated in step (e)(2):
wherein the aforedescribed method steps are run continuously for a selected amount of time.

2. The method according to claim 1, wherein the heated fresh air is obtained by removing the resulting oxygen-depleted exhaust air from the membrane chamber and heating the fresh air in a heat exchanger using the oxygen-depleted exhaust air.

3. The method according to claim 1, wherein the heated fresh air is obtained by heating fresh air by passing fresh air through a heat exchanger heated with flue gas at a temperature of combustion, the flue gas being drawn from the combustion chamber into the heat exchanger.

4. The method according to claim 1, wherein the cleansing of the cooled flue gas takes place in a gas scrubber.

5. The method according to claim 1, further comprising the step of pre-mixing the gas mixture with the carbonaceous fuel.

6. The method according to claim 1, wherein the membrane chamber comprises one or more membranes.

7. The method according to claim 1, wherein the heated fresh air is obtained by feeding fresh air and the gas mixture in separate streams to a heat exchanger, whereby heat is transferred from the gas mixture to the fresh air.

8. The method according to claim 1, wherein the heated fresh air is obtained by feeding a first source of fresh air and the resulting oxygen depleted exhaust air removed from the permeate side of the chamber to a first heat exchanger in separate streams, whereby heat is transferred to the fresh air from said oxygen depleted exhaust air, and feeding a second source of fresh air and the gas mixture to a second heat exchanger in separate streams, whereby heat is transferred to the second source of fresh air from said gas mixture.

9. The method according to claim 1, wherein the gas mixture is conveyed using a pump.

10. A combustion system comprising a combustion chamber having a burner, a membrane chamber, a source of air in fluid communication with an inlet on a retentate side of the membrane chamber, the air being at a pressure not exceeding 2 bars, a heat exchanger for heating air provided by the source of air positioned upstream of the inlet on the retentate side of the membrane chamber, the membrane chamber comprising a membrane for extracting oxygen from the air, the membrane operating at a temperature between 600° C. and 1000° C., the membrane chamber having an inlet line for a flue gas on a permeate side of the membrane, the flue gas being produced in the combustion chamber, the membrane chamber having an outlet line on the permeate side of the membrane chamber for a gas mixture of the oxygen for combustion and the flue gas, the outlet line being in fluid communication with the combustion chamber, and a circulation line for circulating the flue gas from the combustion chamber to the inlet on the permeate side of the membrane chamber, wherein a gas cleanser and heat exchanger are disposed in the circulation line upstream of the inlet on the permeate side of the membrane chamber for cleansing and heating the flue gas.

11. The combustion system according to claim 10, wherein at least one of the heat exchangers is disposed inside the combustion chamber.

12. The method according to claim 2, wherein the cleansed heated flue gas is heated to the temperature of combustion.

13. The method according to claim 2, wherein the cleansing of the cooled flue gas takes place in a gas scrubber.

14. The method of claim 1 wherein the cleansed heated flue gas is obtained by heating the cleansed cooled flue gas in a heat exchanger located inside of the combustion chamber.

15. The method of claim 1 wherein the heated fresh air is obtained by heating the fresh air in a heat exchanger located inside of the combustion chamber.

* * * * *